United States Patent
Ledrappier et al.

(10) Patent No.: US 11,821,517 B2
(45) Date of Patent: Nov. 21, 2023

(54) METAL SEAL COMPRISING A TEXTURED OUTER SEALING LAYER

(71) Applicants: COMMISSARIAT À L'ÉNERGIE ATOMIQUE ET AUX ÉNERGIES ALTERNATIVES, Paris (FR); TECHNETICS GROUP FRANCE SAS, Saint Etienne (FR)

(72) Inventors: Florent Ledrappier, Saint Paul Trois Chateaux (FR); Jean-François Juliaa, Montelimar (FR); Marin Teissier, Saint Paul Trois Chateaux (FR); Michel Lefrancois, Saint Etienne (FR); Thierry David, Uchaux (FR); Tony Zaouter, Baden (FR)

(73) Assignees: COMMISSARIAT À L'ÉNERGIE ATOMIQUE ET AUX ÉNERGIES ALTERNATIVES, Paris (FR); TECHNETICS GROUP FRANCE SAS, Saint Etienne (FR)

( * ) Notice: Subject to any disclaimer, the term of this patent is extended or adjusted under 35 U.S.C. 154(b) by 164 days.

(21) Appl. No.: 17/413,340

(22) PCT Filed: Dec. 13, 2019

(86) PCT No.: PCT/FR2019/053058
§ 371 (c)(1),
(2) Date: Jun. 11, 2021

(87) PCT Pub. No.: WO2020/120920
PCT Pub. Date: Jun. 18, 2020

(65) Prior Publication Data
US 2022/0057029 A1    Feb. 24, 2022

(30) Foreign Application Priority Data
Dec. 14, 2018  (FR) ...................................... 1872908

(51) Int. Cl.
*F16J 15/08*    (2006.01)

(52) U.S. Cl.
CPC ....... *F16J 15/0806* (2013.01); *F16J 15/0881* (2013.01); *F16J 15/0893* (2013.01)

(58) Field of Classification Search
CPC .... F16J 15/061; F16J 15/0806; F16J 15/0881; F16J 15/0887; F16J 15/0893; F16J 15/121; F16J 15/122; F16L 23/18; F16L 23/20
See application file for complete search history.

(56) References Cited

U.S. PATENT DOCUMENTS

| | | | |
|---|---|---|---|
| 2,211,247 A | 8/1940 | Victor et al. | |
| 3,197,358 A | 7/1965 | Angioletti et al. | |

(Continued)

FOREIGN PATENT DOCUMENTS

| | | | |
|---|---|---|---|
| CN | 112728084 A | * | 4/2021 |
| EP | 0148088 A2 | | 7/1985 |

(Continued)

OTHER PUBLICATIONS

International Search Report for PCT/FR2019/053058 dated Apr. 30, 2020.

(Continued)

*Primary Examiner* — Nicholas L Foster
(74) *Attorney, Agent, or Firm* — Pearne & Gordon LLP

(57) ABSTRACT

A static metal seal comprising an outer sealing layer, wherein the outer sealing layer comprises a textured surface that is configured to come into contact with the surfaces that are to be sealed, the textured surface comprising a network of depressions spaced apart from one another on the textured surface, wherein the depressions are blind, do not pass all the way through the outer sealing layer, and do not communicate with one another.

14 Claims, 5 Drawing Sheets

(56) References Cited

U.S. PATENT DOCUMENTS

| | | | | |
|---|---|---|---|---|
| 3,285,615 A * | 11/1966 | Trbovich | F16J 15/025 | 277/639 |
| 3,314,684 A * | 4/1967 | Millhiser | F16J 15/0818 | 29/888.3 |
| 3,751,048 A * | 8/1973 | Rode | F16J 15/0887 | 277/649 |
| 4,218,067 A * | 8/1980 | Halling | F16J 15/021 | 277/645 |
| 4,553,759 A * | 11/1985 | Kilmoyer | F16K 41/04 | 277/529 |
| 4,561,662 A | 12/1985 | de Villepoix et al. | | |
| 4,602,888 A * | 7/1986 | Court | F16L 23/20 | 277/645 |
| 5,232,229 A * | 8/1993 | Udagawa | F16J 15/0825 | 277/600 |
| 5,354,072 A * | 10/1994 | Nicholson | F16J 15/0887 | 277/647 |
| 5,797,604 A * | 8/1998 | Inagaki | F16J 15/0887 | 277/653 |
| 6,056,291 A * | 5/2000 | Inagaki | F16J 15/0893 | 277/618 |
| 6,322,087 B1 * | 11/2001 | Swensen | F16L 23/04 | 277/653 |
| 6,769,696 B2 * | 8/2004 | Diez | F16L 23/20 | 277/593 |
| 7,372,933 B2 * | 5/2008 | Ohsono | G21F 5/12 | 277/618 |
| 7,490,835 B2 * | 2/2009 | Diez | F16L 23/20 | 277/593 |
| 7,866,670 B2 * | 1/2011 | Dhole | F02F 11/00 | 277/592 |
| 8,146,924 B2 | 4/2012 | Ohmi et al. | | |
| D732,149 S * | 6/2015 | Young | F16J 15/106 | D23/269 |
| D740,401 S * | 10/2015 | Young | F16J 15/106 | D23/269 |
| 9,157,531 B2 | 10/2015 | Guimet et al. | | |
| D743,009 S * | 11/2015 | Young | B29C 59/04 | D23/269 |
| 9,739,378 B2 * | 8/2017 | Vu | F16J 15/0887 | |
| 9,822,879 B2 * | 11/2017 | Schmitt | F16J 15/0818 | |
| 9,890,860 B2 | 2/2018 | Reytier et al. | | |
| 9,945,484 B2 * | 4/2018 | Moehrle | F01D 11/003 | |
| 9,970,547 B2 * | 5/2018 | Vu | F16J 15/3236 | |
| 10,422,429 B2 * | 9/2019 | Vu | F16J 15/0806 | |
| 10,428,959 B2 | 10/2019 | Guimet et al. | | |
| 10,533,662 B2 * | 1/2020 | Vu | F16J 15/0806 | |
| 10,982,768 B2 * | 4/2021 | Vu | F16J 15/0806 | |
| 11,255,433 B2 * | 2/2022 | Vu | F16J 15/0887 | |
| 11,300,205 B2 * | 4/2022 | Vu | F16J 15/0887 | |
| 2002/0153669 A1 | 10/2002 | Caplain et al. | | |
| 2003/0062691 A1 * | 4/2003 | Diez | F16J 15/0825 | 277/590 |
| 2004/0160017 A1 * | 8/2004 | Diez | F16J 15/0825 | 277/593 |
| 2007/0013145 A1 * | 1/2007 | Detmann | F16J 15/0825 | 277/593 |
| 2008/0093808 A1 * | 4/2008 | Quick | B23K 26/355 | 277/592 |
| 2012/0073343 A1 * | 3/2012 | Prehn | F16J 15/0887 | 72/51 |
| 2012/0292862 A1 * | 11/2012 | Moehrle | F01D 11/005 | 277/654 |
| 2015/0123354 A1 * | 5/2015 | Laser | B26F 1/26 | 277/648 |
| 2015/0300495 A1 * | 10/2015 | Vu | F16J 15/3236 | 277/608 |
| 2017/0356549 A1 * | 12/2017 | Vu | F16J 15/0806 | |
| 2018/0259070 A1 * | 9/2018 | Vu | F16J 15/3236 | |
| 2018/0259071 A1 * | 9/2018 | Vu | F16J 15/0806 | |
| 2018/0306322 A1 * | 10/2018 | Vu | F16J 15/3236 | |
| 2020/0182354 A1 * | 6/2020 | Vu | F16J 15/0887 | |
| 2020/0191271 A1 * | 6/2020 | Vu | F16J 15/0887 | |
| 2021/0310560 A1 * | 10/2021 | Vu | F16J 15/3236 | |

FOREIGN PATENT DOCUMENTS

| | | |
|---|---|---|
| FR | 2151186 A5 | 3/1973 |
| FR | 2557662 A1 | 7/1985 |
| FR | 2823826 A1 | 10/2002 |
| GB | 1356727 | 6/1974 |
| GB | 2169362 A | 7/1986 |
| JP | S6034573 A | 2/1985 |

OTHER PUBLICATIONS

Search Report for French application No. FR1872908 dated Sep. 10, 2019.

English translation of the Written Opinion of the International Searching Authority for PCT/FR2019/053058 dated Apr. 30, 2020.

* cited by examiner

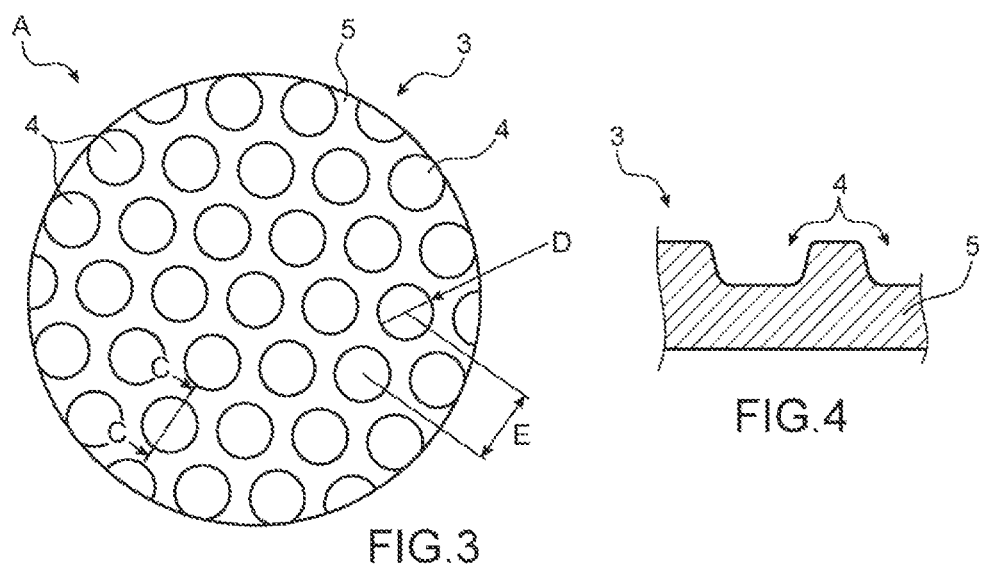
FIG.3
FIG.4
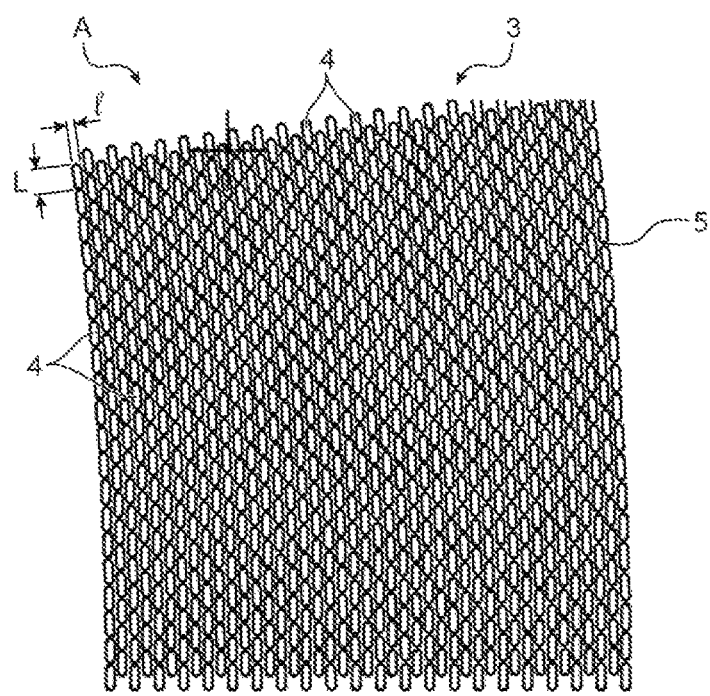
FIG.5

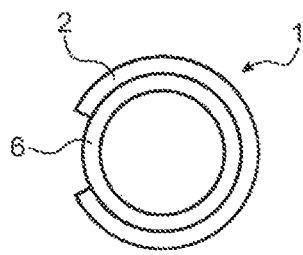
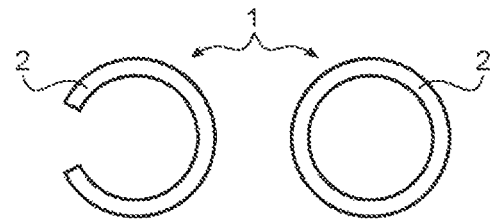
FIG.7  FIG.8
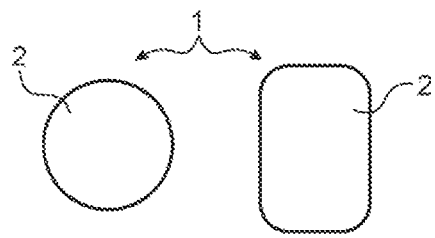
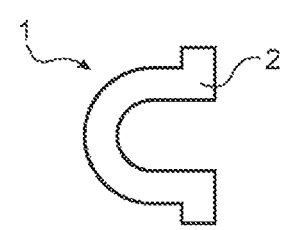
FIG.9  FIG.10
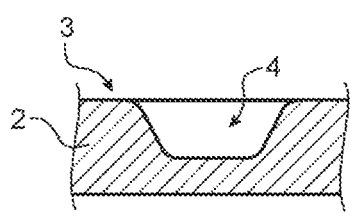
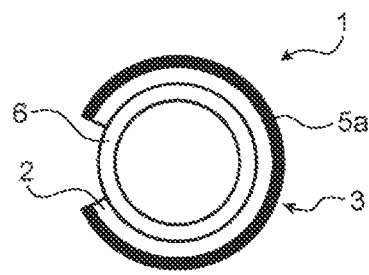
FIG.11  FIG.12
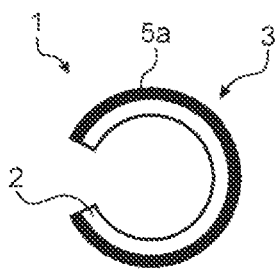
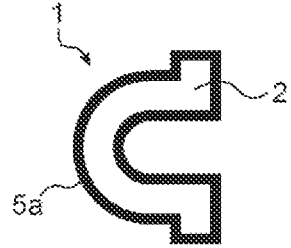
FIG.13  FIG.14

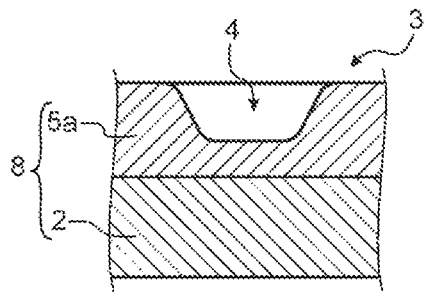
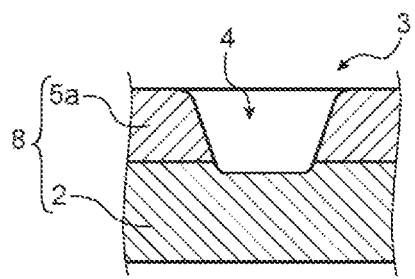
FIG.15    FIG.16
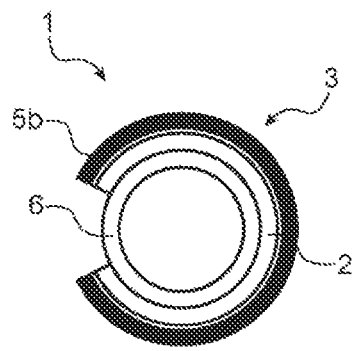
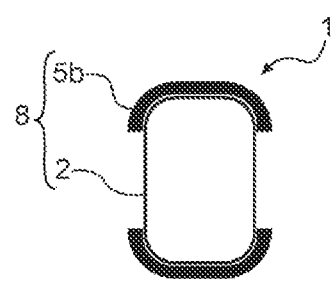
FIG.17    FIG.18
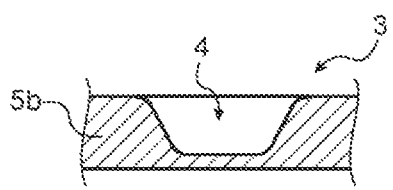
FIG.19

METAL SEAL COMPRISING A TEXTURED OUTER SEALING LAYER

CROSS-REFERENCE TO RELATED APPLICATIONS

This is a National Stage application of PCT international application PCT/FR2019/053058, filed on Dec. 13, 2019, which claims the priority of French Patent Application No. 1872908, filed Dec. 14, 2018, both of which are incorporated herein by reference in their entirety.

TECHNICAL FIELD

The present invention relates to the field of static metal seals.

It is applicable in various industrial fields, and typically for the production of the sealing between two flanges.

Thus, the invention relates to a static metal seal comprising an outer sealing layer having a textured surface.

PRIOR ART

The metal seal is a technology widely used in many critical sealing applications, typically in situations where one or more of the following four conditions are found: ultrahigh vacuum, high pressure, chemically aggressive liquid, high temperature.

As for any seal, it is desired to jointly obtain: a high level of sealing; a lowest possible compressive force; a largest possible sealing run.

Resolving this problem is currently feasible, subject to having, in contact with the flanges, a highly ductile sealing material, such as for example silver.

Thus, an example of metal seal is described in French patent application FR 2 151 186 A1. According to this example, an outer coating is plasticised during the crushing of the seal and is inserted into the roughness of the flanges in contact. A radially crushed spring ensures the initial rigidity (in order to plasticise the coating) and the elastic return after crushing. This concept has many advantages; wide sealing run, high level of sealing, adaptability to wide groove depth tolerances. The force needed to compress the seal is however substantial, and this is all the more true with certain sealing coatings. For example, the linear application force may more than double if a silver coating is changed to a nickel coating.

European patent application EP 0 148 088 A2 presents a change to this concept, by adding thereto a machining operation creating protruding portions in contact with the faces. By applying the plasticising stress of the coating on a narrower line, the overall compressive force of the seal may thus be reduced. However, this has a certain number of drawbacks. First of all, the run width is significantly reduced. A radial defect, even of small dimension, on the sealing face risks strongly inducing a leakage. In addition, the concentration of forces on a protruding line may, particularly if the sealing material is not very ductile, create on the flange faces local surface depressions, commonly known as "caulkings".

Alternatively to this, patent application FR 2 823 826 A1 proposes to multiply the peripheral projections. In comparison with a solution with a single projection, the leakage risk is limited in the event of radial defect. The caulking problem for its part is not resolved.

It can also be noted the existence of American U.S. Pat. No. 8,146,924 B2 that describes a low-compression force metal seal comprising a coating layer provided with a polymer material on a sealing surface of the seal.

Industrial applications exist for which it is necessary to use a coating that is not very ductile, for example for chemical compatibility issues. In this case, it is noticed that the known prior art does not make it possible to work efficiently with this type of material: sealing correctly on a wide run without in as much increasing the compressive force or damaging the flanges is not achievable.

Consequently, there is a need to propose a solution making it possible, for a given application force, to increase the local contact pressures that favour the plugging of leakage paths, whilst keeping a wide sealing run making it possible to adapt to the geometric defects of the face.

DESCRIPTION OF THE INVENTION

The aim of the invention is to remedy at least partially the needs mentioned above and the drawbacks relating to the embodiments of the prior art.

Thus, one object of the invention, according to one of its aspects, is a static metal seal including an outer sealing layer, characterised in that the outer sealing layer includes a textured surface configured to come into contact with the surfaces to be sealed, said textured surface including a network of depressions spaced apart from one another on the textured surface, the depressions being blind, not completely passing through the outer sealing layer, and not communicating with one another.

Advantageously, the static metal seal may have, in transverse section, at least one hollow portion, particularly a plurality of hollow portions, configured to limit the force needed to crush the seal. Also, the static metal seal may be a so-called "hollow" seal, as opposed to so-called "solid" seals. In particular, at least one of the constituent layers of the seal may have, in transverse section, said at least one hollow portion. In addition, said at least one hollow portion may advantageously extend around the entire circumference of the corresponding layer or layers.

Advantageously, the presence of a hollow portion in the seal according to the invention may make it possible to improve the effect obtained by the presence of the textured surface. Indeed, as opposed to a solid seal, the hollow seal may enable a better control of the crushing force, and this control of the crushing favours the correct operation of the textured surface.

"Outer sealing layer" means a layer whereof the surface deforms to ensure the plugging of surface defects of the face in order to thus perform the sealing.

In a non-exhaustive manner, the outer sealing layer may include: a coating, for example a strip, forming a sealing barrier that covers the core of the seal; a deposit, for example electrolytic, forming a contact sealing layer that covers the sealing runs; the actual material of the last layer of the core of the seal with or without treatment intended to reduce its surface mechanical properties.

Thanks to the invention, the use of a metal seal having a textured surface makes it possible to have the advantage of favouring the penetration of the sealing surface of the seal into the anfractuosities of the surface opposite whilst maintaining a wide sealing run: on the one hand, by reducing the bearing area ratio, and on the other hand, by facilitating the plastic flow of the material. Thus, the invention makes it possible to limit the necessary application forces in order to obtain the sealing or improve the sealing for a given application force.

Miscellaneous depression geometries may be envisaged depending on the service conditions and sealing materials employed.

The metal seal according to the invention may further include one or more of the following features taken alone or according to any possible technical combinations.

The textured surface may be partly formed on the outer sealing layer, particularly at portions of the outer sealing layer intended to come into contact with the surfaces to be sealed.

According to a first variant, the outer sealing layer alone forms the metal seal. The metal seal is thus devoid of core.

According to a second variant, the metal seal includes a metal core enveloped in the outer sealing layer. In this case, the outer sealing layer may be applied on the metal core so as to obtain a sealed interface with the metal core, particularly by producing the outer sealing layer by way of a material deposit on the metal core. The outer sealing layer may also consist of a material attached on the metal core by forming therewith an unsealed interface.

The metal core may consist of a spring, particularly a helical spring with contiguous coils closed on itself and having, in the resting state, the shape of a toroid. The outer sealing layer, wherein the core is inserted, may have, in the resting state, the shape of a toric surface whereof the generating circle does not close on itself. More specifically, the textured surface may be applied on the surface of the outer sealing layer, in the portions intended to be in contact with the faces to be sealed, of a metal spring-core seal such as described in French patent application FR 2 151 186 A1.

The outer sealing layer may include a sealing barrier and a possible contact sealing layer on the sealing barrier. This contact sealing layer may in particular be a sealing surface treatment, particularly a layer of an electrolytic deposit, for example of nickel, and/or an additional sealing barrier, which is independent of the sealing barrier.

The depressions may be present only on the sealing barrier in the absence of a contact sealing layer, these depressions being blind.

The depressions may also be present on the contact sealing layer.

In particular, the depressions may be present on a contact sealing layer in the form of a layer of an electrolytic deposit blindly or not.

The depressions may also be present on the contact sealing layer in the form of an additional sealing barrier blindly. In this case, the contact sealing layer in the form of an additional sealing barrier is independent of the sealing barrier whereon it rests. Therefore, there is no close contact between these two elements. The depressions may not then pass completely through the contact sealing layer otherwise a leakage is created.

The depth of the depressions is less than the thickness of the outer sealing layer. The depth of the depressions may also be less than the thickness of the contact sealing layer. Alternatively, the depth of the depressions may be greater than the thickness of the contact sealing layer and less than the sum of the thicknesses of the contact sealing layer and of the sealing barrier.

In addition, the depth axis of each depression may be substantially perpendicular to the textured surface.

Each depression may be defined by at least one wall hollowed out into the textured surface that is substantially perpendicular to the textured surface.

Moreover, the bearing area ratio, defined in the textured surface by the surface without depressions to total surface ratio of the textured surface, may preferably be less than 40%.

The textured surface may include a network of depressions in the form of circular holes, whereof the axes are particularly substantially perpendicular to the textured surface. The ratio between the pitch of the circular holes, namely the distance between the centres of two adjacent circular holes, and the radius of a circular hole, corresponding to half of the diameter of a circular hole, may be less than or equal to 3.

Alternatively, the textured surface may include a network of depressions in the form of elongated-shaped holes, particularly oblong, elliptical and/or rectangular-shaped. Then, the large axis of each elongated-shaped hole is substantially parallel with the sealing line of the seal, and this in any point of the seal.

Moreover, the metal seal may be a seal whereof the section is O-Ring or a seal whereof the section is C-Ring or a seal whereof the section is recumbent U-shaped.

In addition, the textured surface may, for example, be produced by way of a removal of material by laser.

The metal seal according to the invention may include any one of the features stated in the description, taken alone or according to any technically possible combinations with other features.

BRIEF DESCRIPTION OF THE DRAWINGS

The invention may be better understood on reading the following detailed description, non-limiting examples of implementation thereof, as well as examination of the figures, schematic and partial, of the drawing appended, wherein:

FIG. 3 illustrates a detailed view, according to A, of FIG. 2 to present a first embodiment of the textured surface, with circular-shaped depressions, FIG. 4 is a partial sectional view according to C-C of FIG. 3, FIG. 5 illustrates a detailed view, according to A, of FIG. 2 to present a second embodiment of the textured surface, with oblong-shaped depressions, FIGS. 7 to 19 illustrate, in partial section, miscellaneous examples of metal seals in accordance with the invention, FIGS. 11, 15, 16 and 19 presenting detailed sectional views of depressions.

In all of these figures, identical references may designate identical or similar elements.

In addition, the various portions shown in the figures are not necessarily according to a uniform scale, to make the figures more readable.

DETAILED DESCRIPTION OF SPECIFIC EMBODIMENTS

It will now be described, with reference to FIGS. 1 to 19, examples of embodiments of the invention.

It should be noted that, advantageously, the invention proposes a different approach in the modification of the surface of the metal seal in the zones known to be in contact with the faces to be sealed. This approach applies to all types of metal seals.

Figure 1:
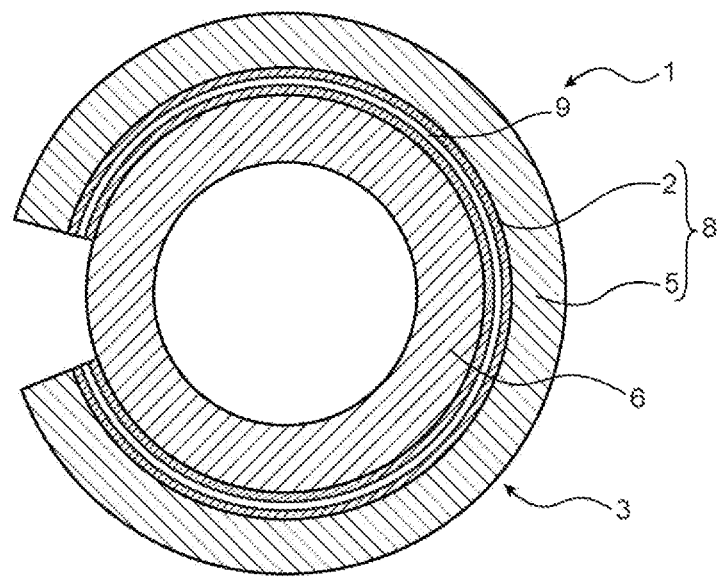
FIG. 1 shows, according to a sectional view, an example of static metal seal in the form of a spring elastic metal seal in accordance with the invention.
Figure 2:
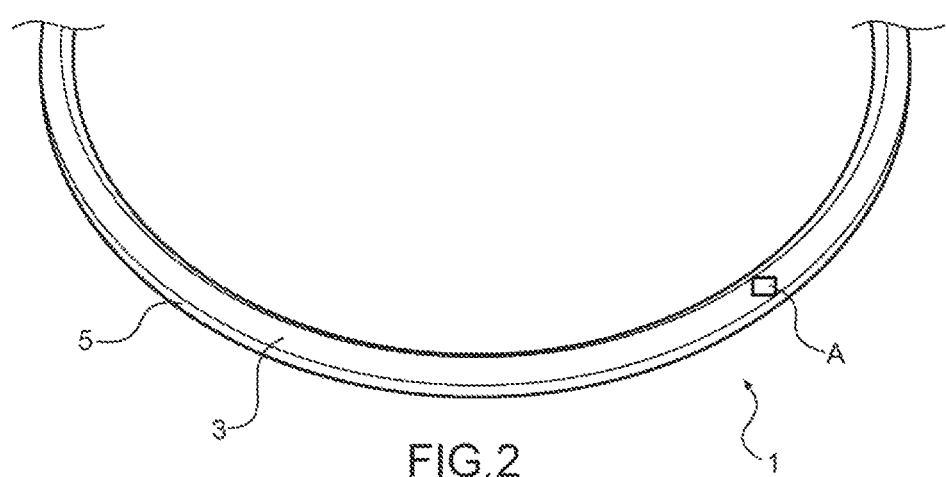
FIG. 2 shows, according to a partial perspective view, the example of seal of FIG. 1, the spring not being shown, the seal being surface structured.

Thus, as can be seen in FIG. 1, the static metal seal 1 in accordance with the invention, in the form of a spring elastic metal seal includes a metal core 6, consisting of a spring, and an outer sealing layer 8 comprising a sealing barrier 2, which includes a hollow portion 9 around the entire circumference of the sealing barrier 2 to make it possible to limit the force needed to crush the seal 1, and a contact sealing layer 5. The outer sealing layer 8 includes a textured surface 3, on the contact sealing layer 5, configured to come into contact with the surfaces to be sealed.

As can be seen in FIGS. 3 and 4, this textured surface 3 includes a network of depressions 4 spaced apart from one another on the textured surface 3, the depressions 4 being blind, not completely passing through the contact sealing layer 5, and not communicating with one another.

Thus, the invention implements a texturing of the surface of the outer sealing layer 8. The outer sealing layer 8 is distinct from the metal core 6, the metal core 6 being embedded in the outer sealing layer 8. In particular, the sealing barrier 2 may consist of a material attached on the metal core 6. The sealing barrier 2 and the contact sealing layer 5 form a sealed interface (the fluids may not diffuse at the interface).

On this textured surface 3, as can best be seen in FIGS. 3, 4 and 5, a network of depressions 4 is provided, whereof the axis is parallel with the compression direction of the seal. These depressions 4 are a network of discontinuous patterns over the entire contact surface of the seal. It should be noted that this discontinuous network of depressions 4 positively leaves a continuous meshing of the surface.

The materials that are not very ductile tend to work-harden rapidly. Therefore it is important to leave them degrees of freedom to enable them to flow better during their axial compression. The free spaces left by the depressions 4 make it possible for the material to spread more easily in a plane perpendicular to the compression direction.

These depressions 4 also make it possible to reduce the bearing surface of the seal 1: at identical application force, the contact pressure on the material is locally greater and the penetration of the material in the roughness of the flanges in contact increases. The caulking risk is also reduced, because the contact surface 3 thus textured does not have explicitly protruding geometry; the increase in contact pressure is therefore carried out without singular points and homogeneously.

The run width remains sufficiently wide to prevent a leakage due to a local surface defect (scratches on the flanges for example). It should also be noted that the discontinuity of the network of depressions 4 has the advantage of naturally constituting cells for containing the leakage; the latter may prove useful, for example if the sealing surface of the flange is degraded, or in the case of a concentricity defect between the machining scratches of the flange and the seal.

Moreover, the surface modification proposed is less fragile than a protruding surface machining thanks to its greater bearing area ratio and its non-protruding geometry, which stands out from the disclosure of French patent application FR 2 557 662 A1.

In addition, it is important that the geometry of the depressions 4 be controlled and it is also advisable that their creation does not generate detrimental local changes in order to obtain the sealing in the features of the materials within their vicinity. The process for creating them is therefore important in relation to these points. A removal of material by laser, for example, may make it possible to jointly control the geometry of the depressions 4 and their impact on the zones within their vicinity.

Preferred texturing geometries make it possible to optimise the performance of the seal 1. A first example, seen in FIG. 3, consists of creating circular holes 4, whereof the axes are perpendicular to the surface of the seal.

Preferably, each hole 4 is produced such that its cylindrical surface is as perpendicular as possible to the surface of the seal 1. The depth of the depressions 4 will be sufficient to enable a flow of the material, for example in the order of 40 μm. The diameter D is in the order of 40 μm, and the pitch E, distance between the centres of the adjacent circular holes, is in the order of 54 μm.

In addition, in order to have a significant reduction of the bearing area ratio, preferably but not exclusively in the order of 40%, the 2E/D ratio is preferably less than three. Therefore, a sufficient bearing area remains to cover potential micro-defects of the flange, with however a very interesting improvement of the contact pressures and forces.

A second interesting example of texturing consists of the production of elongated holes 4, preferably generally oblong or elliptical shaped, as seen in FIG. 5. The length L may be in the order of 120 μm, the width may be in the order of 40 μm and the depth may be in the order of 40 μm.

Preferably, the large axis of such a shape will then be parallel to the sealing line, and this in any point of the seal.

In a preferred embodiment, the texturing selected may be applied on the surface of the sealing layer of a metal spring-core seal such as described in French patent application FR 2 151 186 A1.

Moreover, the texturing selected may be applied on the surface of the sealing layer of an O-Ring type seal, O-shaped, or also a C-Ring type seal, C-shaped, this list not being limiting.

Figure 6:
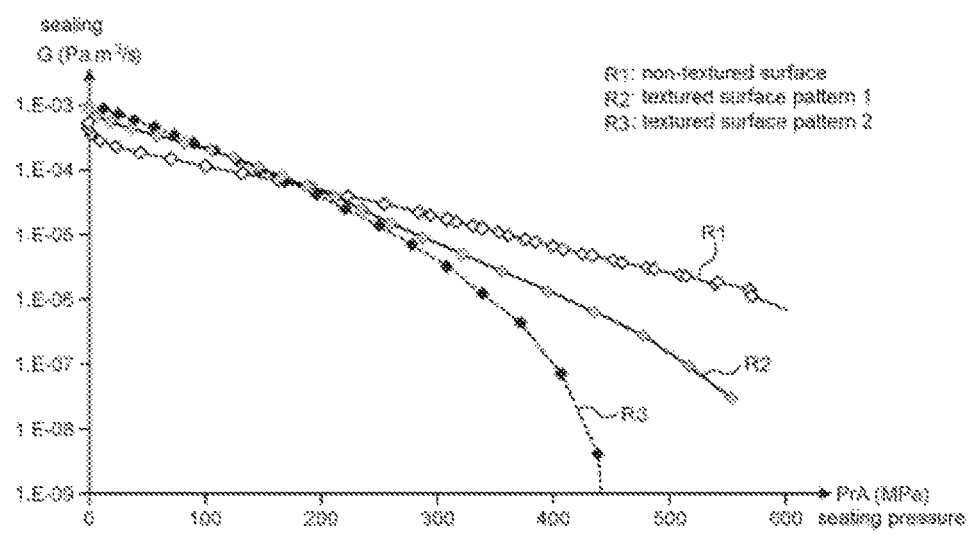
FIG. 6 is a graph illustrating the interest of the texturing by presenting the evolution of the sealing G, expressed in Pa·m$^3$/s, for various surface texturings depending on the seating pressure PrA, expressed in MPa.

The improvement in sealing is illustrated in FIG. 6, comparing the evolution of the leakage flow G depending on the seating pressure PrA, whereon the curve R1 represents a reference curve (non-textured surface), the curve R2 represents a bearing area of 60% (textured surface pattern 1) and the curve R3 represents a bearing area of 40% (textured surface pattern 2). In this example, the advantage of the texturing above 200 MPa is very clear.

FIGS. 7 to 19 illustrate, in partial section, examples of metal seals 1 in accordance with the invention.

FIGS. 7 to 10 illustrate metal seals 1 comprising an outer sealing layer 8 formed by a single sealing barrier 2, which includes non-through depressions 4 as seen in FIG. 11 which is a partial sectional view of the sealing barrier 2.

FIG. 7 illustrates a spring elastic metal seal 1 comprising a metal core 6 in the form of a spring. FIG. 8 illustrates two elastic metal seals 1 whereof the section is O-Ring or C-Ring. FIG. 9 illustrates two metal seals 1 of circular or substantially rectangular section. FIG. 10 illustrates a machined metal seal 1 of recumbent U-shaped section.

FIGS. 12 to 14 illustrate metal seals 1 with an outer sealing layer 8 comprising a sealing barrier 2 and a contact sealing layer in the form of a surface treatment of the electrolytic deposit type 5a, which includes non-through depressions 4 in the layer 5a as seen in FIG. 15, which is a partial sectional view of the outer sealing layer 8, or non-through in the layers 5a and 2 as seen in FIG. 16, which is a partial sectional view of the outer sealing layer 8.

FIG. 12 illustrates a spring elastic metal seal 1 comprising a metal core 6 in the form of a spring. FIG. 13 illustrates two elastic metal seals 1 whereof the section is O-Ring or C-Ring. FIG. 14 illustrates a machined metal seal 1 of recumbent U-shaped section.

FIGS. 17 and 18 illustrate metal seals 1 with a sealing barrier 2, solid in the case of FIG. 18, comprising a surface treatment in the form of an additional sealing barrier 5b, which includes non-through depressions 4 as seen in FIG. 19, which is a partial sectional view of the additional sealing barrier 5b.

FIG. 17 illustrates a spring elastic metal seal 1 comprising a metal core 6 in the form of a spring. FIG. 18 illustrates a metal seal 1 of substantially rectangular section.

Of course, the invention is not limited to the examples of embodiments that have just been described. Miscellaneous modifications may be made by the person skilled in the art.

Furthermore, it should be noted that, even when only the preceding example described with reference to FIG. 1 shows the presence of a hollow portion 9 in the seal 1, all of the examples of previously described seals 1 may advantageously include one or more hollow portions 9 for limiting the force needed for the crushing.

What is claimed is:

1. A static metal ring seal, having, in a transverse cross-section, at least one hollow portion configured to limit the force needed to crush the seal, and including an outer sealing layer, including a textured surface configured to come into contact with surfaces to be sealed, said textured surface including a network of depressions spaced apart from one another on the textured surface, the depressions being blind, not completely passing through the outer sealing layer, and not communicating with one another, wherein the network of depressions includes a large plurality of substantially uniform micro depressions, and wherein a ratio of a surface without depressions to a total surface of the textured surface is less than 40%.

2. The seal according to claim 1, wherein the outer sealing layer alone forms the metal seal.

3. The seal according to claim 1, including a metal core enveloped in the outer sealing layer.

4. The seal according to claim 3, wherein the metal core consists of a helical spring with contiguous coils closed on itself and having, in a resting state, the shape of a toroid.

5. The seal according to claim 4, wherein the outer sealing layer, wherein the core is inserted, has, in the resting state, the shape of a toric surface whereof a generating circle does not close on itself.

6. The seal according to claim 1, wherein the outer sealing layer includes a sealing barrier and a contact sealing layer.

7. The seal according to claim 6, wherein the depressions are present on the contact sealing layer in either a blind or not blind manner.

8. The seal according to claim 1, wherein a depth axis of each depression is perpendicular to the textured surface.

9. The seal according to claim 1, wherein each depression is defined by at least one wall hollowed out into the textured surface that is perpendicular to the textured surface.

10. The seal according to claim 1, wherein the network of depressions is in the form of circular holes with axes that are perpendicular to the textured surface.

11. The seal according to claim 10, wherein a ratio between a pitch of the circular holes, the distance between the centers of two adjacent circular holes, and a radius of one of the circular holes, corresponding to half of a diameter of one of circular holes, is less than or equal to 3.

12. The seal according to claim 1, wherein the depressions are in the form of elongated-shaped holes.

13. The seal according to claim 12, wherein a large axis of each elongated-shaped hole is parallel with a sealing line of the seal, at any point on the seal.

14. The seal according to claim 1, wherein the metal seal is an O-Ring, a C-Ring, or is U-shaped in cross-section.

* * * * *